United States Patent
Hein

(10) Patent No.: US 9,938,981 B2
(45) Date of Patent: Apr. 10, 2018

(54) COMPRESSOR CIRCUIT FOR A PNEUMATIC CONTROL DEVICE OF A MOTOR VEHICLE

(71) Applicant: Continental Teves AG & Co. oHG, Frankfurt (DE)

(72) Inventor: Dierk Hein, Wedemark (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 454 days.

(21) Appl. No.: 14/349,464

(22) PCT Filed: Oct. 10, 2012

(86) PCT No.: PCT/EP2012/070046
§ 371 (c)(1),
(2) Date: Apr. 3, 2014

(87) PCT Pub. No.: WO2013/057021
PCT Pub. Date: Apr. 25, 2013

(65) Prior Publication Data
US 2014/0241859 A1    Aug. 28, 2014

(30) Foreign Application Priority Data
Oct. 20, 2011   (DE) .................. 10 2011 084 921

(51) Int. Cl.
*F04D 27/00* (2006.01)
*B60G 17/052* (2006.01)
*F04D 27/02* (2006.01)

(52) U.S. Cl.
CPC ....... *F04D 27/004* (2013.01); *B60G 17/0525* (2013.01); *B60G 17/0528* (2013.01); *F04D 27/0261* (2013.01)

(58) Field of Classification Search
CPC .......... F04B 49/08; F04B 49/02; F04B 49/03; F04B 49/22; F04B 49/225; F04B 2205/06;
(Continued)

(56) References Cited

U.S. PATENT DOCUMENTS 3,054,552 A   9/1962   Doubleday et al.
5,344,189 A   9/1994   Tanaka
(Continued)

FOREIGN PATENT DOCUMENTS

CN   2597228 Y    1/2004
DE   10055108     5/2002
(Continued)

OTHER PUBLICATIONS

Graphic Symbols for Fluid Power Diagrams (American Society of Mechanical Engineers, 1967, New York, NY. (USAS Y32.10-1967)).*

(Continued)

*Primary Examiner* — Michael Leslie
*Assistant Examiner* — Richard Drake
(74) *Attorney, Agent, or Firm* — RatnerPrestia

(57) ABSTRACT

The invention relates to a compressor circuit for a pneumatic control device of a motor vehicle, including: a compressor, and a pressure regulator, the pressure regulator being arranged between an input side of the compressor and the pneumatic control device, wherein the pressure regulator is designed to measure an upstream pressure of air from the pneumatic control device present on its side facing the pneumatic control device and to supply this air at an input pressure to the input side of the compressor, the pressure regulator being designed to control the input pressure on the basis of said measurement.

5 Claims, 1 Drawing Sheet

(58) Field of Classification Search
CPC .......... F04B 2205/061; F04B 2205/063; F04B 2205/05; F04B 2205/01; F04B 2205/016; F04B 2205/17; F04B 2205/171; F04B 2207/042; F04D 27/004; B60G 17/0523; B60G 17/052; B60G 17/0525; B60G 17/0528
USPC ............... 417/278, 279, 295, 115; 267/64.16
See application file for complete search history.

(56) References Cited

U.S. PATENT DOCUMENTS

| | | | |
|---|---|---|---|
| 5,383,718 A * | 1/1995 | Burgdorf | B60T 8/341 303/113.2 |
| 6,036,449 A | 3/2000 | Nishar et al. | |
| 6,220,675 B1 * | 4/2001 | Steffes | B60T 8/341 303/11 |
| 6,726,189 B2 | 4/2004 | Folchert et al. | |
| 7,063,511 B2 * | 6/2006 | Urbank | F04B 27/1804 417/222.2 |
| 7,097,166 B2 * | 8/2006 | Folchert | B60G 17/0523 267/64.28 |
| 7,484,747 B2 | 2/2009 | Geiger | |
| 7,552,932 B2 | 6/2009 | Matern et al. | |
| 8,151,584 B2 * | 4/2012 | Tanaka | F25B 41/043 62/228.1 |
| 9,341,177 B2 * | 5/2016 | Field | F04B 49/022 |
| 2002/0070523 A1 | 6/2002 | Roemer et al. | |
| 2004/0228737 A1 | 11/2004 | Folchert | |
| 2005/0276702 A1 | 12/2005 | Reisinger et al. | |
| 2007/0246999 A1 | 10/2007 | Hilberer | |
| 2009/0079155 A1 | 3/2009 | Rehra et al. | |
| 2014/0241859 A1 | 8/2014 | Hein | |

FOREIGN PATENT DOCUMENTS

| | | |
|---|---|---|
| DE | 10203075 A1 | 8/2002 |
| DE | 10240357 | 3/2004 |
| DE | 10321771 A1 | 12/2004 |
| DE | 102004028479 A1 | 1/2005 |
| DE | 10338162 | 6/2005 |
| DE | 102008034240 | 1/2010 |
| EP | 0162222 A2 | 11/1985 |
| EP | 0285099 A1 | 10/1988 |
| EP | 0530366 | 3/1993 |
| EP | 1243447 | 9/2002 |
| EP | 1442903 A1 | 8/2004 |
| EP | 1479584 A1 | 11/2004 |
| EP | 1731335 A1 | 12/2006 |
| EP | 1807296 A1 | 7/2007 |
| EP | 2561170 A1 | 2/2013 |
| EP | 2768684 A1 | 8/2014 |
| FR | 2820090 | 8/2002 |
| JP | S56141806 U | 10/1981 |
| JP | H04169318 A | 6/1992 |
| WO | 2011133560 A1 | 10/2011 |

OTHER PUBLICATIONS

International Search Report corresponding to application No. PCT/EP2012/070046, dated Jan. 24, 2013.
German Search Report corresponding to application No. DE 10 2011 084 921.1., dated Jun. 20, 2012.
European Search Report for European Application No. 12769683.9, dated Sep. 26, 2017, 9 pages.
Grote, Karl-Heinrich et al., "Dubbel Taschenbuch für den Maschinenbau", Springer Vieweg, 2014, Ed. 24, 2014, 2 pages.

* cited by examiner

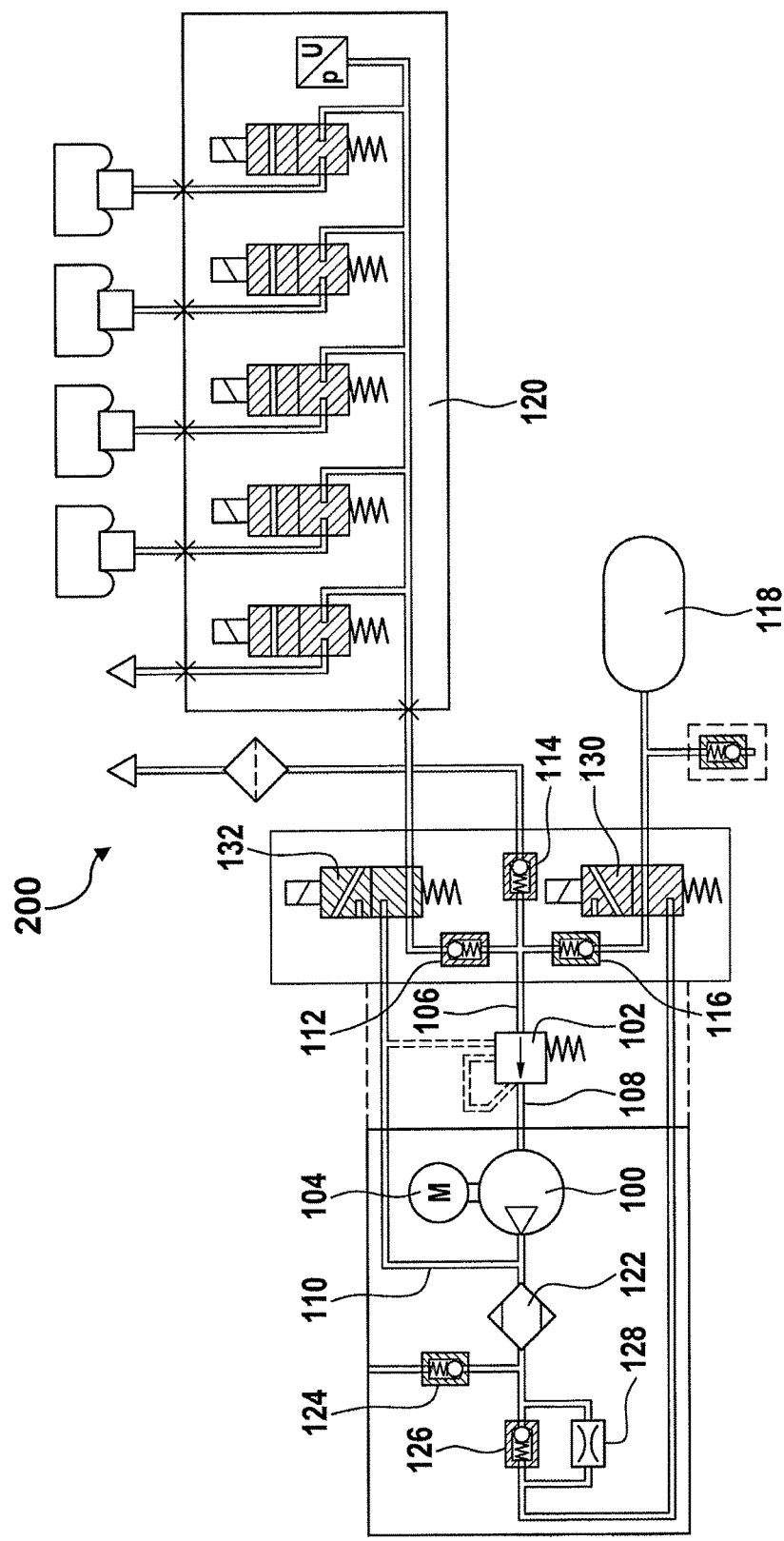

COMPRESSOR CIRCUIT FOR A PNEUMATIC CONTROL DEVICE OF A MOTOR VEHICLE

CROSS REFERENCE TO RELATED APPLICATION

This application is the U.S. National Phase Application of PCT International Application No. PCT/EP2012/070046, filed Oct. 10, 2012, which claims priority to German Patent Application No. 10 2011 084 921.1, filed Oct. 20, 2011, the contents of such applications being incorporated by reference herein.

FIELD OF THE INVENTION

The invention relates to a compressor circuit for a pneumatic control device of a motor vehicle.

BACKGROUND OF THE INVENTION

The previous state of the art for pneumatic control devices of a motor vehicle is reproduced in the following documents:
DE 102 40 357 A1, which is incorporated by reference.
EP 1 243 447 A2, which is incorporated by reference.
DE 100 55 108 A1, which is incorporated by reference.
DE 102 008 034 240 A1,which is incorporated by reference.

SUMMARY OF THE INVENTION

In contrast, an aspect of the invention is to provide an improved compressor circuit for a pneumatic control device of a motor vehicle.

This is achieved by a compressor circuit for a pneumatic control device of a motor vehicle is provided, comprising:
a compressor,
a pressure regulator,
wherein the pressure regulator is arranged between an inlet side of the compressor and the pneumatic control device, wherein the pressure regulator is configured to measure an admission pressure of air from the pneumatic control device present on its side oriented towards the pneumatic control device and to supply this air at an inlet pressure to the inlet side of the compressor, and wherein the pressure regulator is configured to regulate the inlet pressure in dependence on the measurement.

This can have the advantage that the compressor does not have to be redesigned in each case for changed operating conditions of a pneumatic control device of a motor vehicle. This is because the pressure regulator converts, for example, the admission pressure of air from the pneumatic control device presenton its side orientated towards the pneumatic control device, which air would have to pass next through the compressor, into an inlet pressure of the compressor at which the compressor can achieve preferably the greatest power consumption in each case. This further has the advantage that, in the event of a change in the operating condition of the pneumatic control device of a vehicle, no constructional changes to the compressor have to be made, so that no further costs are incurred in production. The pressure regulator can therefore ensure that, independently of the operating mode of the pneumatic control device of a vehicle at the time, the admissible performance limit of the compressor can be exploited to the maximum in each case.

According to an embodiment of the invention, the compressor circuit is configured to be used in the operating mode of a closed air supply and/or in the operating mode of an open air supply.

The claimed embodiment of the invention makes it possible, when designing the compressor, to take the operating condition of an open air supply as a starting point. This implies increasing the stroke and/or the bore of the compressor in order to improve the delivery rate of the compressor from the open environment in the case of the open air supply mode. This design of the compressor oriented by the operating parameters in the case of open air supply can also be used for the operating mode of a closed air supply, since the pressure regulator again regulates the inlet pressure in the closed air supply mode in such a way that it is independent of the admission pressure, and the prescribed performance limit of the compressor is not exceeded.

According to the prior art, the compressor is designed according to the operating conditions of a closed air supply, since the closed air supply mode requires a greater power consumption than the open air supply mode. However, the design of compressors up to now for application to a closed air supply mode implies that, in the open air supply mode, the compressor delivers substantially less air than its electrical power consumption would actually allow. In the prior art, the optimization of the compressor for the conditions existing in the closed air supply mode implies a concurrent impairment of the functional performance of the compressor in the open air supply mode. By contrast, the claimed embodiment of the invention makes it possible to optimize the functional performance of the compressor both in the operating mode of a closed air supply and in the operating mode of an open air supply.

According to an embodiment of the invention, the compressor further has a delivery rate, the pressure regulator being configured to regulate the inlet pressure of the compressor on the basis of measurement of the admission pressure in such a way that the delivery rate of the compressor corresponds continuously to a predefined delivery rate.

This can have the advantage that, as a result of the regulation of the inlet pressure by the pressure regulator, a predefined delivery rate of the compressor can be set according to the desired level of the functional performance of the compressor. Because the conversion of the admission pressure into an optimum inlet pressure of the compressor is oriented continuously towards optimizing the power consumption of the compressor, the compressor could work constantly while exploiting the predefined performance limits, independently of the pressure conditions prevailing in the pneumatic control system and independently of the operating mode.

By continuously measuring the admission pressure and regulating the pressure of the air flowing into the compressor from other components of the pneumatic control device, the pressure regulator can be used, for example, to regulate the inlet pressure in such a way that the vehicle adjustment speed effected by the pneumatic control device corresponds to the wish of the vehicle user at the time. In this context, the vehicle adjustment speed means the speed at which the vehicle chassis can be raised and lowered by the pneumatic control device.

According to an embodiment of the invention, the predefined delivery rate corresponds to an upper admissible performance limit of the delivery rate of the compressor.

As a result of the regulation of the inlet pressure by the pressure regulator, the maximum admissible performance limit predefined by the constructional equipment of the compressor can therefore be adjusted in a specified manner in order to optimize the functional performance of the compressor. For example, the maximum power and therefore the maximum delivery rate of the compressor can be regulated by the pressure regulator. This can have the advantage that both in the open air supply operating mode and in the closed air supply operating mode, the respective admissible performance limits for the delivery rate and for the compression of air by the compressor could be exploited to the maximum. The continuous measuring of the admission pressure and regulating of the pressure of the air flowing into the compressor from other components of the pneumatic control device by the pressure regulator enables the compressor to achieve an optimum delivery rate in delivering air from the environment both in the open air supply mode, which was not ensured according to the prior art hitherto, and also in the closed air supply mode, here again without exceeding the performance limit, which has represented an insoluble dilemma for the prior art up to now.

In this way, in the case of a pneumatic control device for a vehicle, the maximum possible vehicle adjustment speed can, for example, always be set independently of the prevailing pressure conditions.

According to an embodiment of the invention, the pressure regulator is controllable mechanically or electrically.

This can have the advantage that, with mechanical control of the pressure regulator for setting the inlet pressure, for example in the case of a pneumatic control device for a vehicle, the vehicle user can himself manually adjust the timing of the raising and lowering of the vehicle chassis by the pneumatic control device, and the speed of these operations, according to the individual requirements. Electrical activation of the pressure regulator, in which the control unit makes the adjustment by means of the admission pressure on the basis of an input-output map, makes it possible for this vehicle adjustment speed to be autonomously and automatically regulated as a function of the requirements of the operating parameters determined by the vehicle behavior at the time, without the vehicle user having to be active.

According to an embodiment of the invention, the pressure regulator is further configured additionally to regulate the inlet pressure on the basis of a measurement of a pressure of air from the pneumatic control device present on an outlet side of the compressor.

This can have the advantage that, in setting the optimum inlet pressure, not only the pressure present on the inlet side of the compressor is taken into account, but the pressure conditions prevailing on the outlet side of the compressor, which are dependent on the operating mode of the pneumatic control device at the time, are also taken into account. Depending on which control process is operating in the pneumatic control system at the time, for example "delivery of compressed air from the compressed air reservoir to the pneumatic actuator system", "delivery of compressed air from the pneumatic actuator system to the compressed air reservoir" or a "regeneration phase of the air dryer", the pressure regulator can therefore regulate the inlet pressure on the basis of measuring both the admission pressure and the pressure present on the outlet side of the compressor in such a way that the power consumption and delivery rate of the compressor are optimized independently of admission pressure and counter-pressure. In the case of electrical activation of the pressure regulator, therefore, a control unit can determine the optimal setting of the inlet pressure on the inlet side of the compressor by means of the admission pressure and the counter-pressure on the basis of an input-output map. The additional measuring of a pressure present on the outlet side of the compressor therefore permits further fine regulation of the inlet pressure on the inlet side of the compressor in order to set either a predefined delivery rate or the maximum delivery rate of the compressor.

BRIEF DESCRIPTION OF THE DRAWINGS

Preferred embodiments of the invention are explained in more detail below with reference to the following drawing:

FIG. 1 shows a circuit diagram of the compressor circuit with pressure regulator connected upstream in a pneumatic control device of a motor vehicle.

DETAILED DESCRIPTION OF THE PREFERRED EMBODIMENT

FIG. 1 shows a circuit diagram of a compressor circuit in a pneumatic control device 200 of a motor vehicle. In this case a pressure regulator 102 is connected upstream of the compressor 100, on the inlet side thereof. An admission pressure 106 prevails on the inlet side of the pressure regulator 102, which admission pressure 106, depending on the operating processes of the pneumatic control device, is either produced by air flowing in from the environment for the non-return valve 114, in the raising phase of the vehicle from the compressed air reservoir 118 via a non-return valve 116 after passing through a 3/2-way directional control valve 130, or, in the lowering phase of the vehicle, results from the pneumatic actuator system 120 after passing through a 3/2-way directional control valve 132 and a non-return valve 112.

The pressure regulator 102 converts the admission pressure 106 into an inlet pressure 108 adapted to the performance limit of the compressor 100, on the inlet side of the compressor. In this case the compressor 100 may be driven by a motor 104. On the output side of the compressor 100 a counter-pressure 110 prevails, which may result from the air flows upstream and downstream of an air dryer 122 and from the pneumatic actuator system 120 after passing through a 3/2-way directional control valve 132. The unidirectionality of the air flows and of further components of the pneumatic control device is further determined by a non-return valve 126 and a non-return valve 124. A throttle 128 connected upstream of the air dryer 122 serves to decompress the air.

LIST OF REFERENCES

100 Compressor
102 Pressure regulator
104 Motor
106 Admission pressure
108 Inlet pressure
110 Counter-pressure
112 Non-return valve
114 Non-return valve
116 Non-return valve
118 Compressed air reservoir
120 Pneumatic actuator system
122 Air dryer
124 Non-return valve
126 Non-return valve
128 Throttle
130 3/2-way directional control valve
132 3/2-way directional control valve

The invention claimed is:

1. A compressor circuit for a pneumatic control device of a motor vehicle, the pneumatic control device comprising a pneumatic actuator system and a compressed air reservoir, the compressor circuit comprising:
   a compressor,
   a pressure regulator,
   wherein the pressure regulator is arranged on an inlet side of the compressor and supplies air at an inlet pressure to the inlet side of the compressor,
   wherein the compressor circuit is operable in an open air supply mode and a closed air supply mode,
   wherein in the closed air supply mode, the pressure regulator is configured to convert an admission pressure of air from the pneumatic control device into the inlet pressure and regulate the inlet pressure to the inlet side of the compressor in such a way that the inlet pressure is independent of the admission pressure on the inlet side of the pressure regulator.

2. The device as claimed in claim 1, wherein the compressor further has a delivery rate, and wherein in the open air supply mode the pressure regulator is configured to regulate the inlet pressure in dependence on the admission pressure in such a way that the delivery rate of the compressor corresponds continuously to a predefined delivery rate.

3. The device as claimed in claim 2, wherein the predefined delivery rate corresponds to an upper admissible performance limit of the delivery rate of the compressor.

4. The device as claimed in claim 1, wherein the pressure regulator is controllable mechanically or electrically.

5. The device as claimed in claim 1, wherein the pressure regulator is further configured additionally to regulate the inlet pressure in dependence on a measurement of a pressure of air from the pneumatic control device present on an outlet side of the compressor.

* * * * *